United States Patent [19]

Robertson et al.

[11] 4,109,282

[45] Aug. 22, 1978

[54] APPARATUS AND METHOD FOR PRINTING INFORMATION ONTO A SURFACE

[75] Inventors: Penrose David Robertson; George Franklin Coulouris, both of London, England

[73] Assignee: National Research Development Corporation, London, United Kingdom

[21] Appl. No.: 763,491

[22] Filed: Jan. 28, 1977

[30] Foreign Application Priority Data

Feb. 5, 1976 [GB] United Kingdom ................ 4638/76

[51] Int. Cl.[2] ...................... H04N 5/76; G01D 15/16; H04N 1/24

[52] U.S. Cl. ................................ 358/127; 346/140 R; 358/296

[58] Field of Search .......................... 346/140 R, 33 R

[56] References Cited

U.S. PATENT DOCUMENTS

| | | | |
|---|---|---|---|
| 1,709,926 | 4/1929 | Weaver | 346/75 UX |
| 3,476,874 | 11/1969 | Loughren | 346/75 X |

*Primary Examiner*—George H. Miller, Jr.
*Attorney, Agent, or Firm*—Lawrence E. Laubscher

[57] ABSTRACT

A printing apparatus is provided which permits grey levels to be printed in response to coded electrical signals. The apparatus includes a writing head formed with an array of nibs. Each nib includes a duct formed with two passageways, one passageway for supplying clear ink to the paper and the other for supplying black ink to the paper. Means are provided for controlling the relative flow rates of the two inks in dependence upon input information so as to control the printed grey level in accordance with the information. The apparatus is particularly suited to providing a print of television signals.

12 Claims, 10 Drawing Figures

APPARATUS AND METHOD FOR PRINTING INFORMATION ONTO A SURFACE

FIELD OF THE INVENTION

This invention relates to a printing apparatus and to a method of printing information.

BACKGROUND OF THE INVENTION

In recent years, some new printing methods have been developed for use in computer output printing applications. One such method is ink drop printing. Whilst ink drop printing provides a very high speed output, it is not practical to use ink drop printing where low numbers of articles are required to be printed, nor is it practical to use ink drop printers to produce grey tones.

Many computer outputs are now produced in a format to display on a television screen, the output signals being encoded as standard format television signals so that they are compatible with many types of computer software, and in many situations it would be convenient to provide a printed copy on paper of information displayed on a television screen.

SUMMARY OF THE INVENTION

It is an object of the invention to provide an improved printing apparatus.

It is another object of the invention to provide a printing apparatus which can satisfactorily print grey tones in response to electrical signals representative of said tones.

It is a further object of the invention to provide a printing apparatus capable of printing pictures in response to television signals.

These objects and others are accomplished by means of a printing apparatus comprising first and second reservoirs containing different inks, a surface to be printed, a writing head for writing information on said surface with said inks, means for producing relative movement of said writing head and said surface, said writing head including first and second ink passageways for supplying ink from the said reservoirs respectively to said surface, the passageways being so arranged that ink is supplied therefrom in a line on the surface upon said relative movement of the head and the surface, and control means for controlling selectively the flow of ink though said passageways whereby to permit information to be written selectively in said line.

In a preferred embodiment of the invention, one of the inks is a clear ink and the other is black ink, thereby permitting the apparatus to print grey levels on the surface. Preferably the writing head includes a plurality of the ducts so as to define an array of writing nibs. The nibs can be each used to print a line of a frame of a television picture signal, so as to assemble a printed television picture on the surface to be printed.

BRIEF DESCRIPTION OF THE DRAWINGS

In order that the invention may be more fully understood and readily carried into effect, two embodiments thereof will now be described by way of illustrative example with reference to the accompanying drawings in which.

DESCRIPTION OF PREFERRED EMBODIMENT

Figure 1:
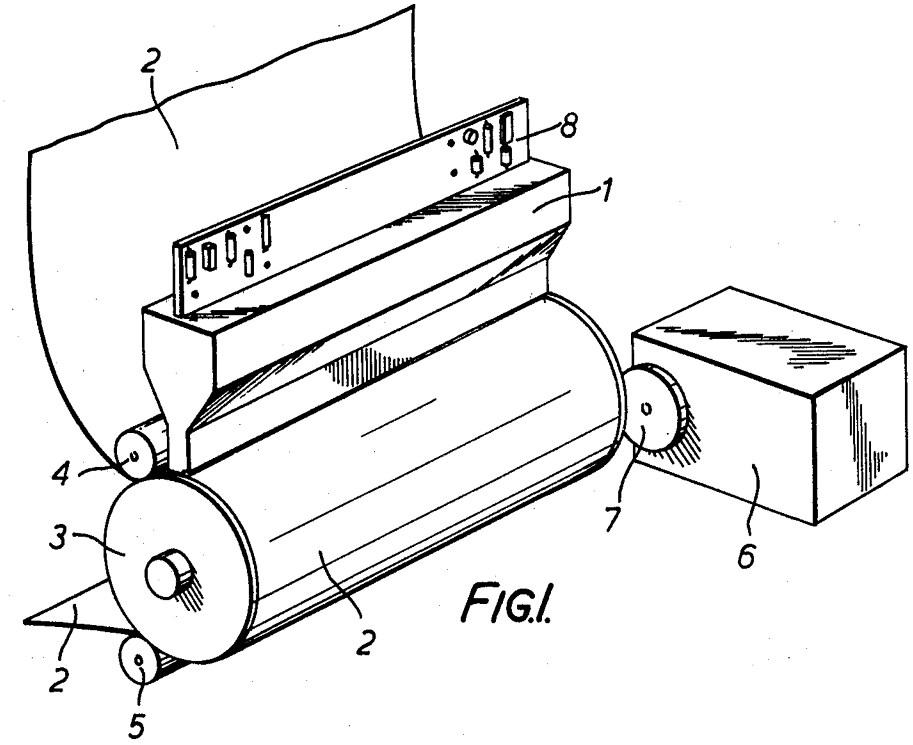
FIG. 1 is a schematic perspective view of a printing apparatus in accordance with the present invention.
Figure 2:
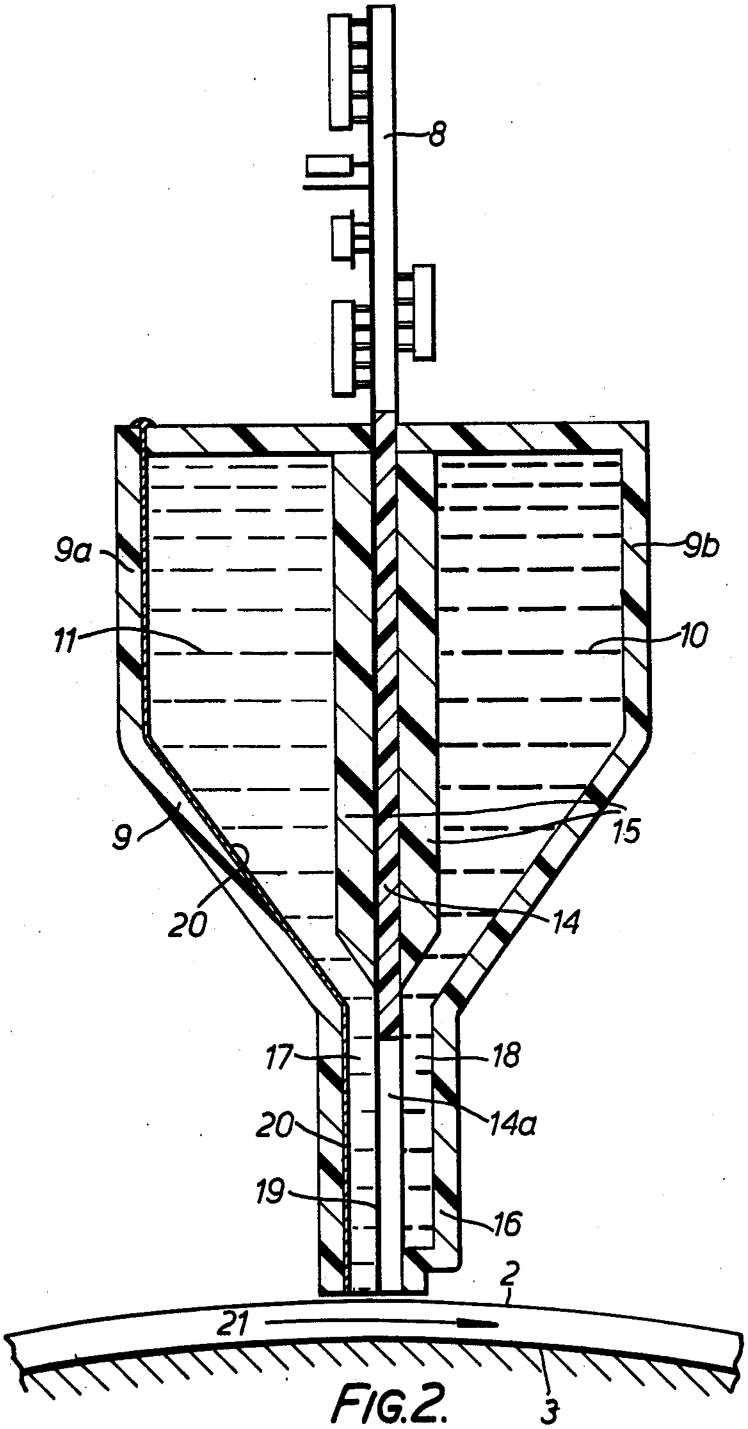
FIG. 2 is a sectional view of the writing head of the apparatus of FIG. 1.

Referring firstly to FIGS. 1 and 2, the printing apparatus comprises a writing head 1 arranged to write information on to a sheet of paper 2 which is moved to brush past the head by a system of rollers including a platen roller 3 and pressure rollers 4, 5. The platen roller 3 is driven by an electric motor 6 through a friction drive roller 7.

The head 1 comprises a plurality of nibs, one of which is shown in section in FIG. 2. Each nib is driven by an electric circuit arrangement 8 such that each nib prints a line of variable density on the paper 2 as it moves past the head 1.

The writing head 1 comprises an elongate, rigid ink reservoir 9 which is divided into two compartments 9*a*, 9*b*, one containing black ink 10 and the other containing a clear ink 11. The ink volumes are separated by a resilient synthetic plastic sheet 14 which for the major portion of its length is embedded in a rigid synthetic plastic member 15. The ink compartments 9*a*, 9*b* extend the whole length of the nib array and extend downwardly to individual rectangular sectioned ducts 16, one for each nib. The synthetic plastic sheet 14 is formed with tongues 14*a* which each extend into a respective one of the ducts 16 to provide separate passageways 17, 18 for the black and clear ink. The tongues 14*a* each operate as a flap valve to control the relative proportions of black and clear ink which emanate from the duct on to the paper sheet 2.

The flap valves formed by the tongues 14*a* are operated electrostatically in this embodiment of the invention. Metallic electrode layers such as 19 are formed on the synthetic plastic sheet 14 extending from the circuit 8 to and over the tongues 14*a*. Another metallic electrode 20 is formed on one wall of each duct 16. By applying suitable electric potentials to the electrodes 19, 20, the tongue 14*a* can be moved between a position entirely cutting off the flow of black ink and to a position cutting off the flow of clear ink thereby permitting selective control of the grey tone of ink deposited on the paper, between black and white levels, defined by a supply totally of the black ink and the whiteness of the paper.

The potentials applied to the electrodes 19, 20 can be chosen to have a magnitude such that the tongues 14*a* take up a position between the walls of the ducts to provide the desired grey level of ink on the paper 2. However, an alternative mode of operation of the tongues 14*a* is to apply alternating voltages to the electrodes 19, 20 such that the flaps oscillate between an "on" position in which substantially only black ink can pass through the duct 16, and an "off" position at which substantially only clear ink can pass through the duct.

The grey level of the ink on the paper is controlled by selectively varying the relative durations of the "on" to "off" periods of the tongue 14*a* during its oscillatory cycle. Such oscillatory operation of the tongues 14*a* will cause microscopic black dots of different size to be deposited on the paper, but with an appropriately absorbant paper, the black dots will merge to produce an appropriate grey level. If the dots do not merge, they can be made small enough to be integrated by the eye of a beholder to provide the appropriate grey level.

Preferably, in use of the apparatus, the paper sheet 2 is moved in the direction of arrow 21 such that the clear ink is swept under the black ink.

The theory of operation of the apparatus is complex and depends on many factors such as the particular papers and inks used. However, it is believed that in operation of the device, the ink is attracted to the paper by a capillary action between the ink and the fibers of the paper 2, in a similar manner to the operation of a conventional fountain pen. In operation of the present apparatus, it is believed that the clear ink when applied to the paper selectively reduces the capillary attraction force between the black ink and the paper in dependence upon the amount of clear ink applied to the paper, so as to inhibit the flow of black ink in dependence upon the volume of clear ink applied to the paper. However, it is not intended that the scope of the claims be limited by the aforementioned theory.

The printing apparatus has particular application to printing frames of television picture signals. Each nib can be arranged to print a respective line of the television picture. A more practical example of printing apparatus for this purpose will now be described with reference to FIGS. 3 to 10.

Figure 3:
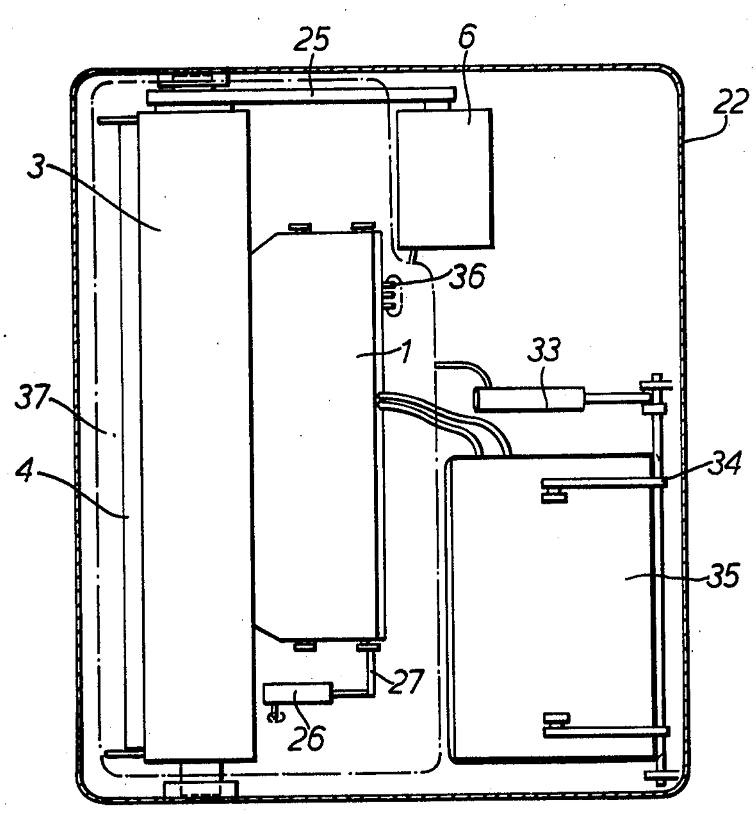
FIG. 3 is a schematic plan view of another printing apparatus in accordance with the invention.
Figure 4:
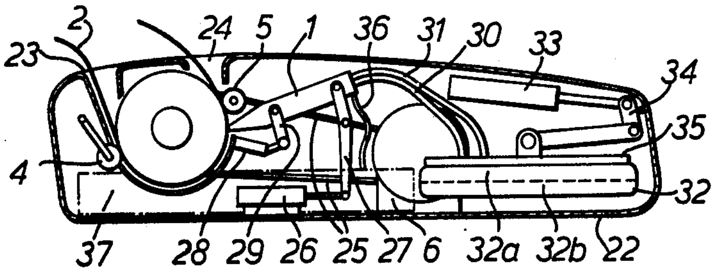
FIG. 4 is an elevational view in partial section of the apparatus of FIG. 3.

Referring to FIGS. 3 and 4, the printing apparatus is semi-portable, the writing head 1 being mounted in a housing 22, which has paper inlet and outlet orifices 23 and 24. The paper sheet 2 passes from the inlet orifice 23 to the outlet orifice 24 around the platen roller 3 which is journalled in the housing, the paper being held in contact with roller 3 by the pressure rollers 4, 5. The roller 3 is driven by a synchronous electric motor 6 though a timing belt 25. The head 1 is mounted to be moved to and from a writing position closely adjacent the roller 3, by a solenoid 26 connected to the head 1 by a lever mechanism 27. The head 1 is also fitted with nib wiping and damping pads 28 which are connected by levers 29 to the head 1 so that the head is automatically wiped and damped by the pads 28 upon movement of the head away from its writing position.

Black and clear inks are supplied to the printing head 1 through conduits 30, 31 respectively, from ink reservoirs comprising a synthetic plastic bag 32 having different compartments 32*a*, *b* for the black and the clear inks. The inks are supplied under pressure to the head 1 by means of a solenoid 33 which operates a lever mechanism 34 that urges a pressure plate 35 downwardly to compress the bag 32.

The array of nibs in the printing head 1 is controlled by electrical signals applied thereto over connecting cables 36 leading from an electronics package 37 shown in dotted outline. The package has an input jack (not shown) mounted on the housing 22 to receive television signals for example from a computer output or from a broadcast television system.

Figure 5:
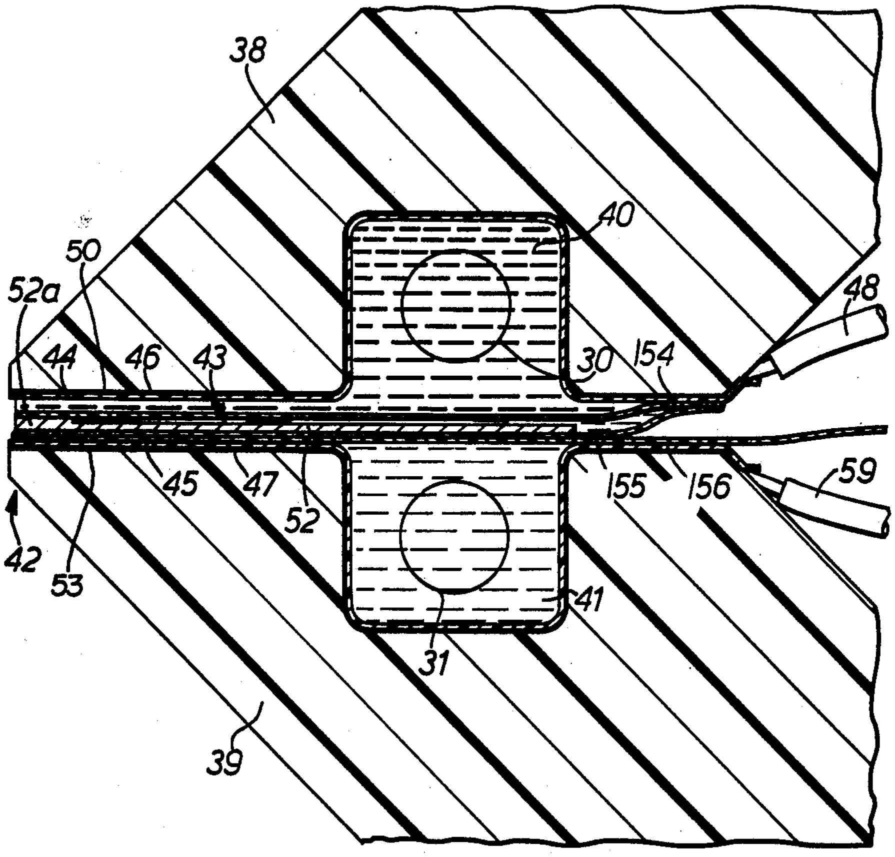
FIG. 5 is a sectional view of the writing head of the apparatus shown in FIGS. 3 and 4.
Figure 6:
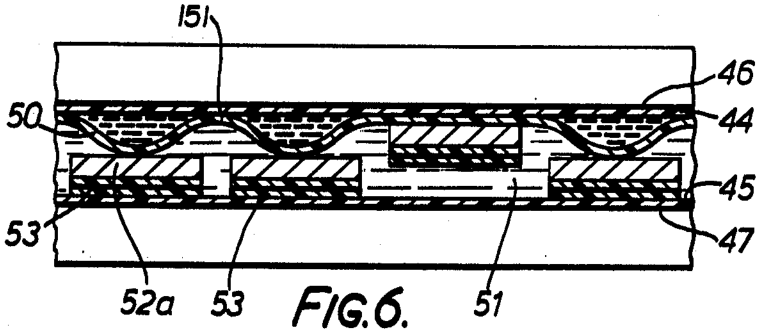
FIG. 6 is an end view of a portion of the writing head of FIG. 5.
Figure 7:
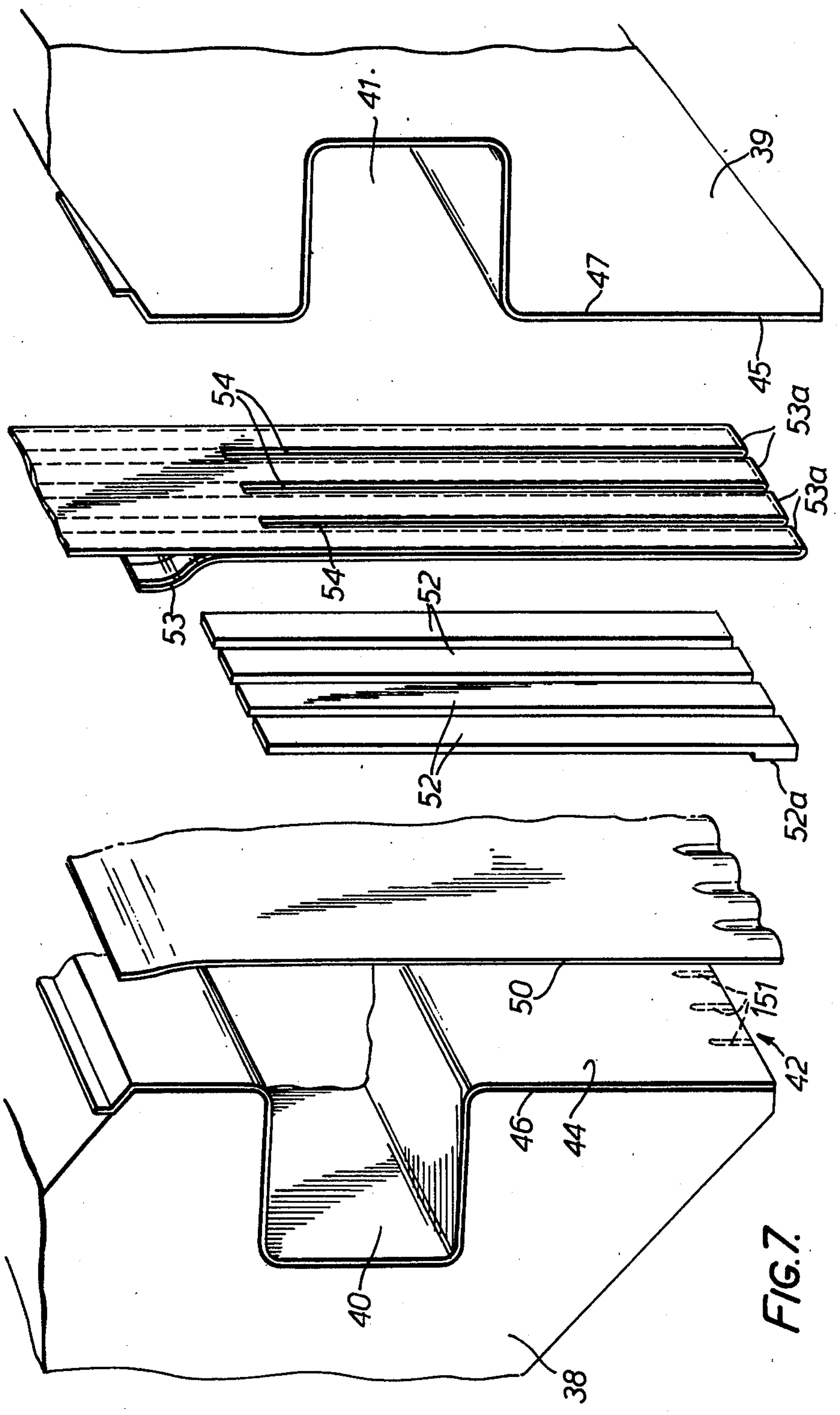
FIG. 7 is an exploded view of the writing head of FIG. 5.

The writing head 1 of FIG. 3 is shown in more detail in FIGS. 5 to 7. The head 1 comprises two elongate body members 38, 39 typically moulded in nylon to have therein longitudinal channel shaped compartments 40, 41 which receive the black and clear inks respectively from the conduits 30, 31. As is shown in FIG. 5, the body members 38, 39 are mounted adjacent one another and are of such a shape as to define an elongate, sharp end 42 for engagement with the paper sheet 2, and to define a slot 43 for the flow of the inks from the channels 40, 41 to the paper through the end 42.

As is shown clearly in FIG. 7, each body member 38, 39 is lined with a film of synthetic plastic material 44, 45 in the channels 40, 41 and in the slot 43. The films 44, 45 typically comprise polyester film and are formed with electrically conductive coatings 46, 47 on the sides of the films that face the nylon members 38, 39. The coatings 46, 47 are typically of aluminium and are connected respectively to positive and negative supply leads 48, 49 which define reference electrical potentials for operating the nibs, as will be described hereinafter.

A further film of synthetic plastic material 50, typically of polyester, is welded to the film 46 in a plurality of weld seams 51 equally spaced apart longitudinally of the end 42. The film 50 tends to bow outwardly of the body member 38 between the weld seams and hence the arrangement provides a plurality of different passageways for black ink to pass from the compartment 40 to the paper 2. The film 50 also constitutes a barrier between the black and clear inks, the clear ink flowing to the paper on the opposite side of film 50 to the black ink, in a single elongate passageway 51 (FIG. 6) from the compartment 41.

Each nib of the writing head 1 is defined by the distance between next adjacent welds 151 such that each nib has its own black ink supply channel. The channels can be individually closed by compressing the film 50 against the film 46 by a respective one of an array of pressure pads 52, each made of a rigid synthetic plastic material. Each pad 52 has associated therewith an electrode on a folded synthetic plastic film 53 which has formed thereon a plurality of aluminized strips 54, one for each nib, the strip being folded over and welded to itself to insulate the strips 54 from the ink. The film 53 is cut between the strips 54 to provide a plurality of fingers 53*a*, one for each pressure pad 52. The pads 52 are attached to the fingers 53*a*.

The films 44, 45, 50 an 53 are selectively welded together at 154, 155 and 156 to prevent leakage of the inks from the printing head 1.

In use, an appropriate electrical potential is applied to each strip 54 to either move the pad 52 associated therewith towards the body member 39 to permit a flow of black ink, or towards the body member 38 to tend to hold the film 50 against the film 44 and thereby close the black ink passageway of the nib.

Figure 9:
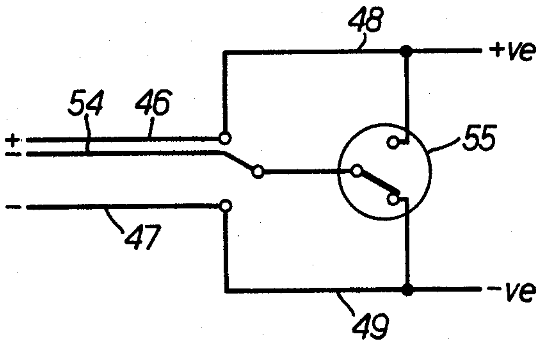
FIG. 9 illustrates schematically an electrode arrangement used in the head.

In this embodiment of printing apparatus, the potentials applied to the strips 54 are switched periodically between the positive and negative potentials applied to the aluminized layers 46, 47. In this way, the nibs are cyclically switched on and off in the manner previously described, by virtue of the electrostatic attraction forces developed between the three electrodes defined by the aluminized layers 46, 47 and the strips 54. A schematic switching arrangement for this purpose, for one of the nibs, is shown in FIG. 9. A switch 55 either connects the strip 54 to the positive supply lead 48 or to the negative lead 49. In the configuration shown in FIG. 9, the strip 47 and hence the associated pad 52, is urged away from the aluminium layer 47 by repulsion, and is also attracted to the layer 46. When the switch 55 is operated, the strip 54 is similarly urged toward the aluminium layer 47.

Figure 10:
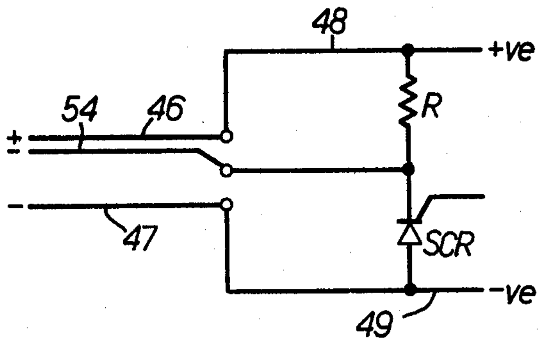
FIG. 10 illustrates a more practical electrode arrangement which is driven by a silicon controlled rectifier.

A more practical switch arrangement is shown in FIG. 10, the switch 55 comprising a resistor R and a thyristor SCR connected in series to define a potentiometer chain, the strip 54 being connected to the chain between the resistor R and the SCR. When the SCR is switched off, presenting an open circuit, the strip 54 assumes a potential through the resistor R, closely approximating to that of the positive lead 48. However upon the SCR being switched on, the strip 54 is connected to the negative lead 49 through the SCR.

Each nib of the printing head is arranged to print one of the lines of the television picture, and the circuits for addressing picture information to the nibs will now be described with reference to FIG. 8.

European standard 625 line UHF television signals are received by an aerial 56 and demodulated by a demodulator 57. The beginning and end of picture frames in the demodulated signal train are detected by a frame discriminator 58, and the lines of a discriminated frame are detected by a line discriminator 59 which increments a line counter 60 when each new line in the signal train is detected. The demodulated signal train is also applied to an analogue to digital converter 61 which produces a binary number having a value between O and N indicative of the luminance or grey level in the picture. The quantization effected by converter 61 is performed sequentially at M picture points along each line of the frame. Corresponding values of M and N are provided on lines 62 and 63 respectively.

The outputs from the line counter 60 and the picture point information M on line 62 are fed as addressing information to a memory or store 64 to provide a picture point address for each quantised luminance signal. Thus after quantization of a complete picture frame, the memory is charged with information relating to a 625 by M array of numbers having a value between O and N indicative of the grey level in the frame. Thus, the picture points of the array can be represented as $p_{ij}$ where $M \geqq i \geqq 1$, and $625 \geqq j \geqq 1$. It will be appreciated that the above described circuit is somewhat schematic since the 625 line frame will in practice comprise two interlaced fields thus requiring a somewhat more complex line discriminator and line counter than is shown.

Figure 8:
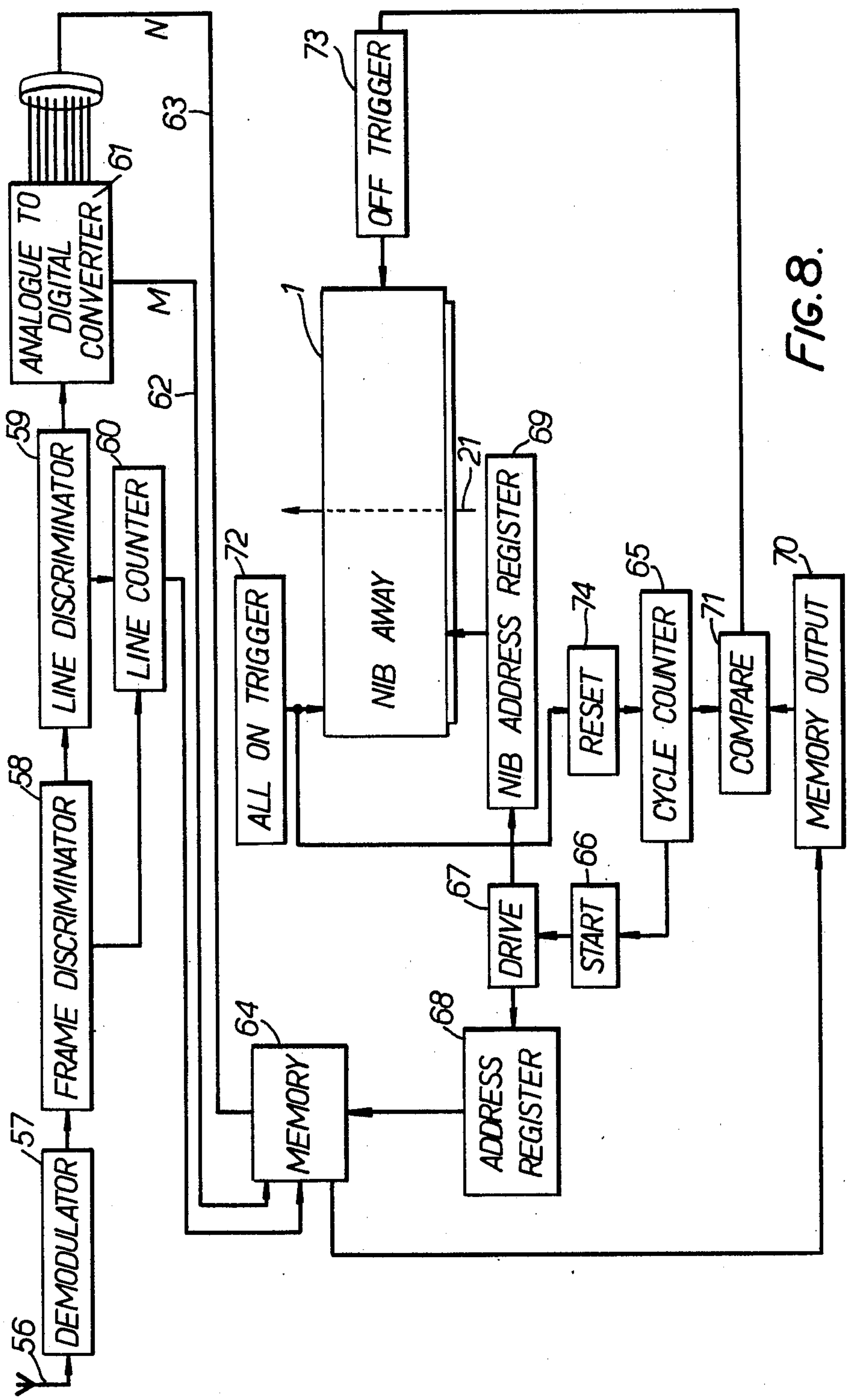
FIG. 8 is a schematic block diagram of an electrical circuit for addressing the printing head with electrical signals such that the head provides printed information in accordance with input television signals.

In operation of the apparatus, the motor 6 of FIG. 1 is arranged to drive the paper 2 past the array of nibs in the printing head 1 at a fixed rate, and the information in the memory 64 of FIG. 8 is addressed to nibs so that the nibs each print on the paper a sequence of M picture point grey levels corresponding to a respective line of the frame. The time allocated for printing each of the M grey levels is divided into N equal time increments, and the nibs are arranged to be switched on (i.e., to pass black ink) for a number of the time increments which corresponds to the stored value of the binary number representing the grey level for the picture point concerned. This mode of operation is implemented in the circuit arrangement of FIG. 8 by means of a cycle counter 65 which counts upwards in N steps during the period allocated for each nib in the array to print a picture point.

The first output from the counter 65 triggers a start circuit 66 which operates a drive circuit 67. The drive register 67 operates simultaneously an address register 68 for the store 64 and an address register 69 for the nibs of head 1. In response to the first number from counter 65, the drive circuit causes the address register 68 to scan across the addresses in the store 64 of the first picture points in each line i.e., $p_{1,1}$; $p_{1,2}$; $p_{1,3} \ldots p_{1,625}$. Simultaneously, the register causes the 625 nibs to be addressed sequentially to receive the addressed information from the store.

The values of grey level (between O and N) for the addressed picture points in the store, are read out in sequence to an output register 70 and are compared sequentially with the value of N in the counter, by means of a comparator 71. At the commencement of the count by counter 65, the nibs are all switched "on" to print black ink by means of a trigger circuit 72. Upon the comparator detecting coincidence of the numbers in counter 65 and the register 70, the comparator provides an output which operates an "off" trigger 73 that switches off the nib addressed by the register 69. The count in the counter 65 is then incremented and the scanning procedure effected by the registers 68, 69, is repeated for the same picture points. In total, the picture points $p_{1,1}; \ldots p_{1,625}$, are addressed N times, once for each increment of the counter 65. During the N address cycles, each nib is left switched on until the number in the store 64 which corresponds to the picture point for the nib has a value equal to the number of the address cycle, the nib then being switched off by means of the comparator 71 and the trigger 73. After the N address cycles, all of the nibs will be switched off since the value of N is chosen to be the same as the maximum digital value of the grey level signals held in the store 64. During the address cycles, the paper 2 is moved continuously past the nib array and hence the nibs will print black dots of a size dependent upon the time the nibs were switched on, thereby recording the grey level information from the store 64 on the paper 2.

The "on" trigger 72 is then arranged to reset all of the nibs to an "on" condition, and a reset circuit 74 resets the counter 65 to zero.

The above described N address cycles are then repeated with the register 68 addressing picture points $p_{2,1} \ldots p_{2,625}$ in the store 64. The procedure is repeated M times in total until the final line of picture information $p_{M1} \ldots p_{M,625}$ is printed on the paper 2.

Clearly, many modifications of the above decribed arrangement are possible. For example, whilst the electronics described with reference to FIG. 8 operate the nibs such that the switch between "on" and "off" positions, they can also be operated in an analogue manner if desired. Also, many modifications to the specific nib structure described can be made. For example, the flap valves in the nibs could be operated by devices not utilising electrostatic forces, and different devices could be used to control the flows of the black and clear inks respectively. Furthermore, different coloured inks can be used and for example, the clear ink could be replaced by white or other colours of ink. Also, the arrangement described with reference to FIG. 8 could easily be modified for use with the 525 line television system which is used in USA and Japan.

We claim:

1. Printing apparatus for applying ink to a surface to be printed, comprising (a) first and second reservoirs containing different inks, respectively;
(b) writing head means connected with said reservoirs for writing information on the surface with said inks, said writing head means including
(1) a body member defining a nib;
(2) said nib containing a duct which terminates at one end in an orifice adjacent the surface; and
(3) a flap valve arranged in said duct for defining first and second ink flow passageways the other ends of which are connected with said first and second reservoirs, respectively;
(c) means for producing relative movement between the writing head and the surface in a direction causing ink to be supplied in a line from said passageways; and
(d) control means for displacing said flap to selectively obturate said passageways, respectively, whereby information may be written selectively in said line as a function of the degree of mixing of said different inks.

2. A printing apparatus in accordance with claim 1, and including a plurality of the nibs in the writing head.

3. A printing apparatus in accordance with claim 1, wherein one of said reservoirs contains black ink and the other of said reservoirs contains clear ink.

4. A printing apparatus in accordance with claim 1, wherein said control means includes an electrode formed on said flap and an electrode formed on the duct, and means for applying selectively variable electrical potentials to said electrodes.

5. A printing apparatus in accordance with claim 4 wherein said reservoirs are formed in the writing head.

6. A printing apparatus comprising:
(a) first and second reservoirs containing different inks;
(b) a paper surface to be printed;
(c) a writing head for writing information on said surface with said inks;
(d) moving means for sweeping said paper surface such as to brush past said writing head;
(e) said writing head including an array of nibs each for writing on the paper surface with said inks, said head comprising:
(i) two body members spaced apart to define an elongate slot;
(ii) a sheet of flexible material in said slot and attached to one of said body members at a plurality of positions spaced apart along the slot;
(iii) means supplying the ink from said reservoirs between the flexible sheet and different ones of said body members respectively;
(iv) a plurality of pressure pads in said slot; and
(v) control means for urging said pressure pads selectively towards the body members whereby to selectively obturate flow of said different inks from said slot on to the paper.

7. A printing apparatus in accordance with claim 6 including electrodes attached to the pressure pads, electrodes on said body members, voltage generator means for applying a potential difference to the electrodes on the body members, and switching means for selectively connecting the electrodes on the pressure pads to either of the potentials applied to the electrodes on the body members; whereby to move the pad to inhibit flow of one of said different inks.

8. Apparatus in accordance with claim 6 wherein said moving means comprises a roller, and an electric motor for driving the roller.

9. A printing apparatus in accordance with claim 6 wherein the control means includes means for holding said pads selectively in a position to permit passage of substantially only one of said inks to the paper, and for holding said pads selectively in a position in which substantially only the other of said inks flows to the paper, switching means for causing cyclic movement of the pads between said positions thereof, and trigger means for controlling the relative durations of the pads in said positions whereby to control the information printed on the paper surface.

10. An apparatus in accordance with claim 9 and adapted to print television picture signals, said apparatus including a store, converter means for charging said store with a spatial array of information regarding the grey level of a television picture, and logic means arranged to control said trigger means whereby to cause said television picture to be printed by said array of nibs.

11. A method of printing information on a surface by means of a writing head having a first passageway with an opening for dispensing a first ink of a first tonal characteristic and a second passageway with an opening for dispensing a second ink of a second tonal characteristic, the respective openings from said first and second passageways being positioned adjacent each other, which method comprises the steps of:
(a) positioning the writing head adjacent a writing surface;
(b) generating relative movement between the writing head and the writing surface so as to draw a continuous flow of ink from said openings onto a common line on said surface by capillary action; and
(c) selectively controlling the relative flow rates of said first and second inks to control the tone of the line formed on the surface in accordance with information to be printed thereon.

12. Apparatus for providing a graphical representation upon a carrier medium, comprising
(a) carrier medium support means;
(b) writing head means for transferring ink directly upon a carrier supported by said support means;
(c) means effecting relative movement between said support means and said writing head means for enabling said writing head to be operative at different positions relative to said carrier medium;
(d) first and second ink reservoirs containing different inks, respectively, said writing head means containing first and second ink passageways connected at one end with said first and second ink reservoirs, respectively, said ink passageways having at their other ends orifices contiguous with said carrier medium for supplying ink directly thereto by capillary action, respectively; and
(e) control means for determining the relative proportions of the inks from said reservoirs supplied to said orifices, respectively, said control means being operable to maintain a continuous supply of ink from said writing head to said carrier medium, whereby the graphical representation provided on said carrier medium comprises a trace of the movement of the head relative to the carrier medium and the tonal characteristic of said trace is variable in dependence upon the different supplies of said different inks to said orifices.

* * * * *